(12) United States Patent
Teraoka (10) Patent No.: US 7,452,299 B2
(45) Date of Patent: Nov. 18, 2008

(54) COUPLING APPARATUS

(75) Inventor: Masao Teraoka, Tochigi (JP)

(73) Assignee: Tochigi Fuji Sangyo Kabushiki Kaisha, Tochigi-shi (JP)

( * ) Notice: Subject to any disclaimer, the term of this patent is extended or adjusted under 35 U.S.C. 154(b) by 136 days.

(21) Appl. No.: 11/240,138

(22) Filed: Sep. 29, 2005

(65) Prior Publication Data

US 2006/0073931 A1    Apr. 6, 2006

(30) Foreign Application Priority Data

Oct. 1, 2004    (JP)    .............................. 2004-290712

(51) Int. Cl.
*F16H 48/24*    (2006.01)
(52) U.S. Cl. ................... 475/150; 192/84.92
(58) Field of Classification Search .................. 475/150, 475/240; 192/84.92
See application file for complete search history.

(56) References Cited

U.S. PATENT DOCUMENTS 4,955,853 A * 9/1990 Bausch ..................... 475/241
5,591,098 A * 1/1997 Jones et al. .................. 475/231
2003/0121750 A1* 7/2003 Teraoka ..................... 192/93 A
2006/0052207 A1 3/2006 Teraoka

FOREIGN PATENT DOCUMENTS

| JP | 2000-240685 | 9/2000 |
| JP | 2003-158862 | 5/2003 |
| JP | 2003-232432 | 8/2003 |

* cited by examiner

*Primary Examiner*—Charles A Marmor
*Assistant Examiner*—Edwin A Young
(74) *Attorney, Agent, or Firm*—Jordan and Hamburg LLP (57) ABSTRACT

The invention can reduce a number of parts, make an assembly and a part management easy and make a setting of an interval in an axial direction easy. A coupling apparatus is constructed by a lock ring which is rotationally engaged with a side gear corresponding to one of a differential case and a side gear capable of relatively rotating with each other by a coupling portion, is movable in an axial direction and has engagement teeth capable of engaging and interrupting with engagement teeth of the differential case on the basis of the axial movement, and an electromagnet which executes a movement in an axial direction of the lock ring on the basis of a line of magnetic force passing through the engagement teeth.

13 Claims, 7 Drawing Sheets

COUPLING APPARATUS

BACKGROUND OF THE INVENTION

1. Field of the Invention

The present invention relates to a coupling apparatus provided for a connection between rotating shafts, a differential lock of a differential unit or the like.

2. Description of the Related Art

In conventional, in a coupling apparatus used in a differential unit, for example, there is a structure in which a rotational force is transmitted and shut off by using an electromagnetic force. In other words, the differential unit is provided with an inner differential case in an inner side of an outer differential case, and a differential mechanism in the inner differential case. A clutch ring interrupting the rotational force between the outer differential case and the inner differential case is provided therebetween. The clutch ring is interlocked with a plunger of a solenoid via a slidable plate.

Accordingly, the plunger is driven by the solenoid to be moved The rotational force is shut off between the outer differential case and the inner differential case by a clutch ring via the slidable plate in correspondence to the movement of the plunger.

However, in the structure mentioned above, since the slidable plate and the plunger are necessary between the solenoid and the clutch ring, a plurality of members are interposed. Accordingly, a number of parts is increased, an assembly and a part management become complicated, and assembling errors in the respective parts are accumulated so as to make setting an interval in an axial direction complicated (for example, refer to Japanese Unexamined Patent Publication No. 2003-158862).

SUMMARY OF THE INVENTION

An object of the present invention is to provide a coupling apparatus reducing a number of parts, making an assembly and a part management easy and making a setting of an interval in an axial direction easy.

A first aspect of the present invention provides a coupling apparatus having a clutch member which is rotationally engaged with one of a pair of rotary members capable of relatively rotating with each other by a coupling portion, is movable in an axial direction, and has an engagement portion engaging and interrupting with an engagement portion of the other rotary member on the basis of the axial movement, and an electromagnet which executes the axial movement of the clutch member on the basis of a line of magnetic force passing through the engagement portions.

Accordingly, it is possible to directly move the clutch member by the electromagnet, and it is possible to reduce the number of the parts by inhibiting the interposition of the other member. Accordingly, the assembly and the part management become easy, and it is possible to easily set the interval in the axial direction by inhibiting the accumulation of the assembling errors in the respective portions.

A second aspect of the present invention arranges the clutch member and the electromagnet in the axial direction.

Accordingly, it is possible to inhibit a loop of the line of magnetic force from a meandering to improve an operation response of the clutch member.

A third aspect of the present invention so arranges the engagement portions as to face to each other in the axial direction.

Accordingly, it is possible to employ a dog clutch engaging face to face to make a stroke in the axial direction of the clutch member small.

A fourth aspect of the present invention provides an energizing member for energizing the clutch member against the axial movement by the electromagnet with the coupling apparatus.

Accordingly, an exciting control may be applied to the electromagnet only for one axial movement of the clutch member, so that it is possible to reduce an electric power consumption.

A fifth aspect of the present invention arranges the energizing member in an inner peripheral side of the engagement portion.

Accordingly, it is possible to overlap the energizing member and the engagement portion in a radial direction to achieve a downsizing in the axial direction. Further, it is possible to inhibit a dispersion of a load in a peripheral direction applied to the clutch member, by arranging the energizing member in the inner peripheral side.

A sixth aspect of the present invention arranges the coupling portion and the engagement portion in both sides of the clutch member individually.

Accordingly, it is possible to transmit the rotational force in series.

A seventh aspect of the present invention provides a thin portion or a low magnetism member inhibiting a short of the line of magnetic force in the other rotary member side. The engagement portion transmits the rotational force without passing through the thin portions or the low magnetism member.

Accordingly, it is possible to prevent the load of the rotational force from being applied to the thin portion or the low magnetism member which tends to become weak in strength, and it is possible to form advantageously in strength.

An eighth aspect of the present invention provides string portions which strike against each other on the basis of the axial movement at differential positions of the clutch member and the other rotary member side shifting with respect to the engagement portion in a radial direction.

Accordingly, it is possible to add a friction force between the starting portions to an adsorption force by the electromagnet to execute a firm rotational force transmission.

A ninth aspect of the present invention provides engagement surfaces with the engagement portions which are brought into contact with each other in front and rear sides of the rotational direction at a time of the engagement. Accordingly, it is possible to firmly engage the engagement portions to inhibit a rickety of the rotational force transmission.

Therefore, it is possible to execute a stable rotational force transmission.

A tenth aspect of the present invention provides facing surfaces in the radial direction through which the line of magnetic force passes with the clutch member and the other rotary member side.

Accordingly, it is possible to easily secure the facing surface through which the line of magnetic force passes.

An eleventh aspect of the present invention applies the coupling apparatus to a differential unit provided with a differential mechanism executing the rotational force transmission in such a manner as to allow a differential rotation from an input side member to a pair of output side members. One of the rotary members serves as the output side member, and the other of the rotary members serves as the input side member.

Accordingly, it is possible to obtain a compact and light coupling apparatus of the differential unit.

A twelfth aspect of the present invention arranges a transmission portion in any one of inner and outer sides in the radial direction of the coupling portion, executing the rotational force transmission between the input and output side members.

Accordingly, it is possible to achieve a downsizing of the apparatus in the axial direction by overlapping the coupling portion and the transmission portion in the radial direction.

A thirteenth aspect of the present invention arranges the coupling portion in an outer periphery of the one rotary member.

Accordingly, it is possible to make the load applied to the coupling portion small to improve a durability.

DESCRIPTION OF PREFERRED EMBODIMENT

The object of reducing the number of the parts, making the assembly and the part management easy and easily setting the interval in the axial direction is achieved by sucking and moving the clutch member.

First Embodiment

Figure 1:
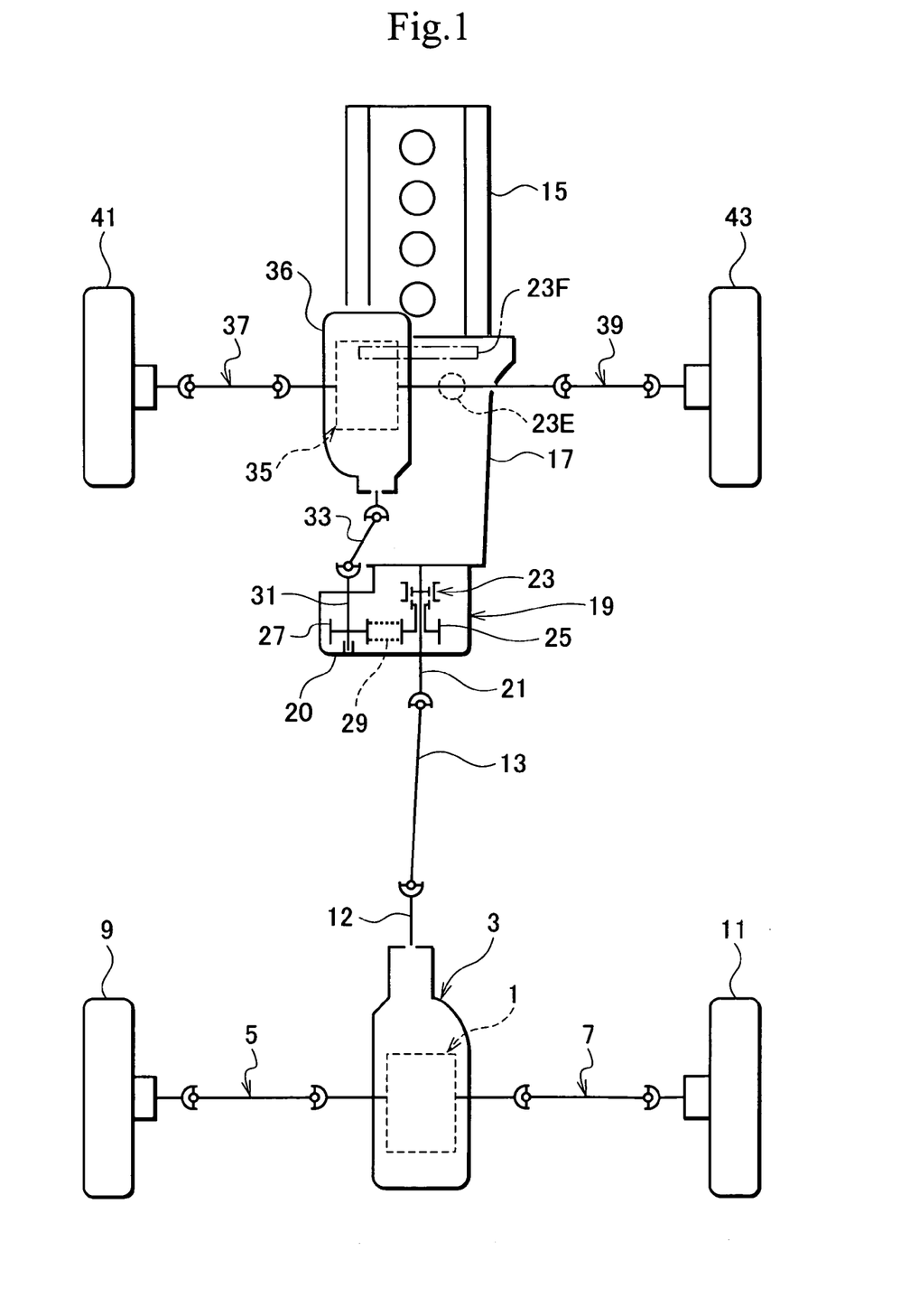
FIG. 1 is a skeleton plan view of a four-wheel drive vehicle according to a first embodiment of the present invention.

FIG. 1 is a skeleton plan view of a four-wheel drive vehicle to which an first embodiment in accordance with the present invention is applied. According to the first embodiment, a differential unit is applied, for example, as a rear differential gear 1 rotatably supported to a differential carrier 3. Left and right rear wheels 9 and 11 are coupled to the rear differential gear 1 via left and right axle shafts 5 and 7, respectively.

A rotational force of a propeller shaft 13 is input to the rear differential gear 1 via a drive pinion shaft 12. The rotational force is transmitted to the propeller shaft 13 from an engine 15 via a transmission 17 and a transfer 19.

A transfer case 20 of the transfer 19 supports a transmission shaft 21. The transmission shaft 21 is provided with an interrupting mechanism 23 and a sprocket 25. A chain 29 is wound around the sprocket 25 with respect to the other sprocket 27. The sprocket 27 is fixed to an output shaft 31 to a front wheel side. The output shaft 31 is coupled to a propeller shaft 33, and the rotational force is transmitted to a front differential gear 35 from the propeller shaft 33. The front differential gear 35 is rotatably supported to a differential carrier 36. Left and right front wheels 41 and 43 are respectively interlocked with the front differential gear 35 via left and right axle shafts 37 and 39.

Accordingly, the rotational force output from the engine 15 is transmitted to the transfer 19 from the transmission 17. When the interrupting mechanism 23 of the transfer 19 is in a connected state, the rotational force from the transmission 17 is transmitted to the propeller shaft 13 in the rear wheel side from the transmission shaft on one hand and is transmitted to the propeller shaft 33 in the front wheel side via the interrupting mechanism 23, the sprocket 25, the chain 29, the sprocket 27 and the output shaft 31 on the other hand.

The rotational force is transmitted to the rear differential gear 1 from the propeller shaft 13 in the rear wheel side, and the rotational force is transmitted to the left and right rear wheels 9 and 11 from the rear differential gear 1 via the left and right axle shafts 5 and 7.

The rotational force is transmitted to the front differential gear 35 from the propeller shaft 33 in the front wheel side, and the rotational force is transmitted to the left and right front wheels 41 and 43 from the front differential gear 35 via the left and right axle shafts 37 and 39.

Accordingly, it is possible to travel in a four-wheel drive state by the left and right front wheels 41 and 43 and the left and right rear wheels 9 and 11.

When the interrupting mechanism 23 of the transfer 19 is in a disconnected state, the rotational force is transmitted only to the propeller shaft 13 in the rear wheel side from the transmission 17 via the transmission shaft 21. Therefore, it is possible to travel in a two-wheel drive state by the rear wheels 9 and 11.

Figure 2:
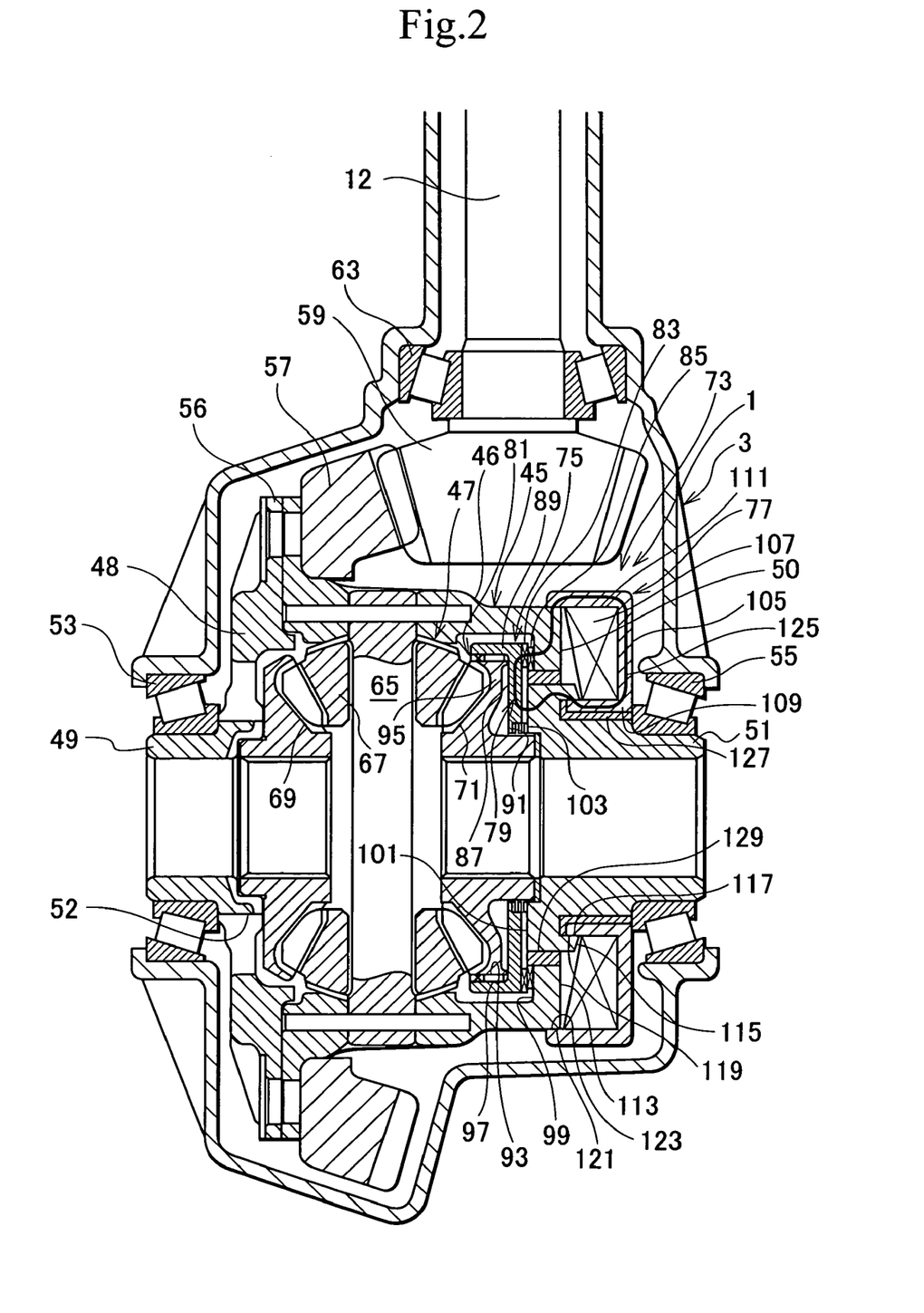
FIG. 2 is a cross sectional view showing a rear differential unit and a periphery thereof according to the first embodiment of the present invention.

FIG. 2 is a cross sectional view showing the rear differential unit and a periphery thereof.

The rear differential gear 1 includes a differential case 45, and a differential mechanism 47 received and supported within the differential case 45 according to the present embodiment. The differential case 45 includes a cylinder portion 46 and left and right side walls 48 and 50. The differential gear 1 is provided with a coupling flange 56 in one side of the outer periphery thereof. The side walls 48 and 50 provided with boss portions 49 and 51 respectively, and the boss portions 49 and 51 are supported to the differential carrier 3 by bearings 53 and 55. The side wall 48 is provided with an opening 52 for supplying a lubricating oil to the differential mechanism 47 or the like.

A ring gear 57 is attached to one side coupling flange 56 in the differential case 45. The ring gear 57 is engaged with a drive pinion gear 59 provided with the drive pinion shaft 12. The drive pinion shaft 12 is rotatably supported to the differential carrier 3 by pinion bearings 63.

The differential mechanism 47 includes a pinion shaft 65, pinion gears 67, and side gears 69 and 71. The pinion shaft 65 is supported to the differential case 45. The pinion gears 67 are rotatably supported to the pinion shaft 65. The pinion gears 67 are engaged with the left and right side gears 69 and 71. The side axle shafts 5 and 7 (shown in FIG. 1) are coupled to the gears 69 and 71.

A differential lock mechanism 73 constituted by a coupling apparatus is provided in the rear differential gear 1. The differential lock mechanism 73 includes a lock mechanism portion 75 and an electromagnet 77.

The lock mechanism portion 75 has a lock ring 79 serving as a clutch member. The lock ring 79 is rotatably engaged with the side gear 71 by a coupling portion 81 provided between the lock ring 79 and the side gear 71 and is movable in an axial direction. The lock ring 79 has engagement teeth 83. The engagement teeth 83 can engage and interrupt with respect to engagement teeth 85 provided in the differential case 45 side on the basis of the movement of the lock ring 79 in the axial direction.

That is, the lock ring 79 is rotationally engaged with one (corresponding to the side gear 71) of a pair of rotary members (corresponding to the differential case 45 and the side gear 71) capable of relatively rotating with each other by the coupling portion 81, is movable in the axial direction, and the engagement portion (corresponding to the engagement teeth 83) engages and interrupts with the engagement portion (corresponding to the engagement teeth 85) of the other rotary member (corresponding to the differential case 45) on the basis of the axial movement of the lock ring 79.

The lock ring 79 includes a disc portion 87 and a peripheral wall portion 89 integrated with an outer periphery of the disc portion 87. The disc portion 87 faces to the side wall 50 of the differential case 45 in the axial direction. The engagement teeth 83 is provided in an opposite side to the peripheral wall portion 89 so as to protrude toward the axial direction, in an outer peripheral side of the disc portion 87. A spring seat concave portion 91 is provided in an inner periphery of the disc portion 87. An inner spline 93 serving as a part of the coupling portion 81 is provided in an inner periphery of the peripheral wall portion 89.

One of a pair of rotary members capable of relatively rotating corresponds to the side gear 71 serving as the output side member in the present embodiment. A clutch engagement portion 95 is integrated with the side gear 71. A spline 97 is provided in an outer periphery of the clutch engagement portion 95. The spline 97 is engaged with the inner spline 93 of the lock ring 79 to structure the coupling portion 81 together with the spline 93. Accordingly, the coupling portion 81 is provided in an outer periphery of one rotary member (corresponding to the side gear 71).

The other of the rotary members corresponds to the differential case 45 serving as the input side member according to the present embodiment. The engagement teeth 85 is provided in an inner surface 99 to protrude toward the axial direction, in the side wall 50 of the differential case 45. In this case, in an inner peripheral side with respect to the engagement teeth 85, an inner surface 101 of the side wall 50 of the differential case 45 protrudes toward a tooth top side of the engagement teeth 85, so that the inner surfaces 99 and 101 forms with a step.

According to the arrangement of the coupling portion 81 and the engagement teeth 83 and 85, the engagement teeth 83 and 85 face to each other in the axial direction and the coupling portion 81 and the engagement portion (corresponding to the engagement teeth 83 and 85) are arranged individually in both sides of the clutch member (corresponding to the lock ring 79).

A spring 103 is interposed between the spring seat concave portion 91 and the inner surface 101 of the differential case 45. The spring 103 serves as an energizing member for energizing the clutch member (corresponding to the lock ring 79) against the axial movement by the electromagnet mentioned below. The spring 103 is arranged in the inner peripheral side of the engagement portions 83 and 85.

The electromagnet 77 includes a yoke 105 and an electromagnetic coil 107. The yoke 105 has an outer peripheral wall 111 and an inner peripheral wall 109 which is shorter than the outer peripheral wall 111 in the axial direction. The electromagnetic coil 107 is formed such that a winding number is gradually increased from the inner peripheral wall 109 side to the outer peripheral wall 111 side.

The side wall 50 of the differential case 45 is provided with a protrusion 115 having an annular shape in an outer periphery 113. An outer peripheral surface 119 of a leading end of the inner peripheral wall 109 of the yoke 105 faces to an inner peripheral surface 117 formed in an inner periphery of the protrusion 115 with a gap. An outer peripheral surface 121 of an end portion of the side wall 50 is formed so as to slightly bulge, and an inner peripheral surface 123 of a leading end of the outer peripheral wall 111 of the yoke 105 faces with a gap.

The electromagnet 77 is supported to an outer periphery of the boss portion 51 of the differential case 45 via a non-magnetic material ring 127 such as a stainless steel or the like so as to be relatively rotatable. A bent end portion of the non-magnetic material ring 127 is interposed between one end in the axial direction of the yoke 105 and the outer surface 113 of the side wall 50 of the differential case 45. The yoke 105 and the other end in the axial direction of the non-magnetic material ring 127 are brought into contact with the bearings 55 to be positioned.

According to the structure mentioned above, the clutch member (corresponding to the lock ring 79) and the electromagnet 77 are arranged in the axial direction.

In order to prevent a short of a magnetic flux of the electromagnet 77, a non-magnetic material ring 129 made from a stainless steel or the like is provided in the side wall 50 of the differential case 45.

Figure 3A:
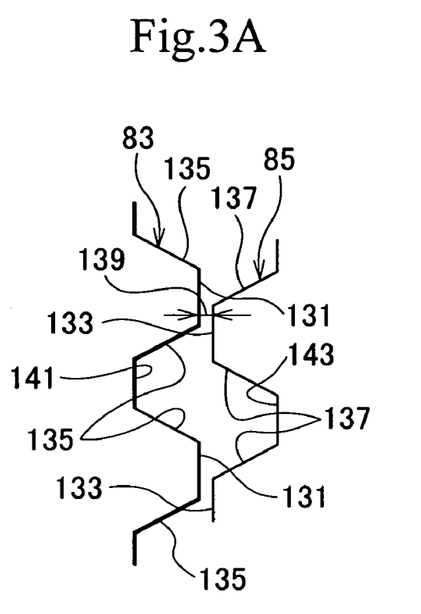
FIG. 3A is an expansion plan view of a main portion showing an engagement shutoff state of engagement teeth according to the first embodiment of the present invention.
Figure 3B:
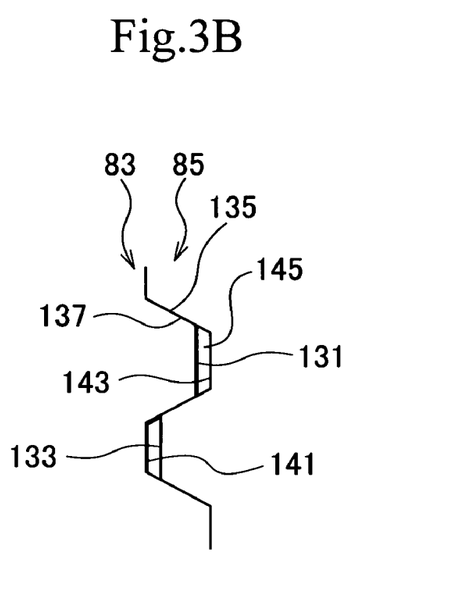
FIG. 3B is an expansion plan view of a main portion showing the engagement shutoff state of the engagement teeth according to the first embodiment of the present invention.

FIG. 3 shows details of the engagement teeth 83 and 85. FIG. 3A is an expansion plan view of a main portion in an engagement shutoff state of the engagement teeth, and FIG. 3B is an expansion plan view of a main portion in an engagement state of the same.

As shown in FIG. 3, the engagement teeth 83 and 85 are both formed in a chevron shape, and each have flat tooth tops 131 and 133 and inclined engagement surfaces 135 and 137 in both front and rear sides in a rotational direction. In the engagement shutoff state shown in FIG. 3A, a gap 139 through which a line of magnetic force can transmit is set between the tooth tops 131 and 133. In the engagement state shown in FIG. 3B, the engagement surfaces 135 and 137 are brought into contact with each other with no gap, and a gap 145 is formed between the tooth tops 131 and 135 and tooth bottoms 143 and 141 respectively. Accordingly, the engagement portion (corresponding to the engagement teeth 83 and 85) is provided with the engagement surfaces 135 and 137 which are brought into contact with each other in the front and rear sides in the rotational direction at a time of engaging.

Next, a description will be given of an operation.

When the electromagnet 77 is not controlled to be excited, the differential lock by the differential lock mechanism 73 is not executed. Accordingly, the rotational force transmitted to the differential case 45 from the drive pinion shaft 12 via the drive pinion gear 59, the ring gear 57 and the coupling flange 56 is output to the left and right axle shafts 5 and 7 via the pinion shaft 65, the pinion gear 67 and the side gears 69 and 71 of the differential mechanism 47.

When the differential rotation is generated between the left and right axle shafts 5 and 7 in the rotational output state, the differential rotation is input to the side gears 69 and 71. At this time, the pinion gear 67 rotates on the pinion shaft 65 serving as a rotary shaft, and the differential rotation between the side gears 69 and 71 is allowed.

In traveling on a punishing road or the like, there is a case that the lockup of the differential rotation is necessary. In this case, the electromagnet 77 is controlled to be excited. On the basis of the exciting control, it forms a loop of a line of magnetic force 125 extending to the inner peripheral surface 123 of the outer peripheral wall 111 of the yoke 105 and the outer peripheral surface 121 of the end portion of the side wall 50, the side wall 50 of the differential case 45, the engagement teeth 85 and 83, the lock ring 79, the boss portion 51 side of the side wall 50, the inner peripheral surface 117 and the outer peripheral surface 119, and the inner peripheral wall 109. The line of magnetic force 25 can natural pass through the portion between the engagement portions (corresponding to the engagement teeth 83 and 85) by setting the gap 139 between the engagement teeth 83 and 85 in FIG. 3A.

The lock ring 79 is sucked toward the electromagnet 77 due to the loop of the line of magnetic force 125. The lock ring 79 moves in the axial direction while rotationally engaging with the side gear 71 via the coupling portion 81 on the basis of the suction, so that the engagement teeth 83 is engaged with the engagement teeth 85 as shown in FIG. 3B. According to the engagement, the differential case 45 and the side gear 71 are locked therebetween via the lock ring 79. The differential rotation of the differential mechanism 47 is locked up on the basis of the lock to lock the differential rotation of the left and right rear wheels 5 and 7.

When the engagement teeth 83 and the engagement teeth 85 are engaged with each other as shown in FIG. 3B, the engagement surfaces 135 and 137 are brought into contact with each other with no gap by the magnetic force on the basis of the existence of the gap 145 between the tooth tops 131 and 135 and the tooth bottoms 143 and 141, so that it is possible to firmly achieve the engagement.

It is possible to widely improve the traveling properly on the punishing road, on the basis of the lockup of the differential rotation.

When the exciting control of the electromagnet 77 is cancelled, the lock ring 79 is moved and returned to the original position on the basis of the energizing force of the spring 103, so that the engagement teeth 83 disengage from the engagement teeth 85. The lockup of the differential mechanism 47 is immediately cancelled by the disengagement.

When the engagement teeth 83 and the engagement teeth 85 disengage from each other, the cam effect between the engagement surfaces 135 and 137 is applied to be able to smoothly operate.

According to the present embodiment, the differential lock mechanism 73 can directly move the lock ring 79 on the basis of the magnetic force of the electromagnet 77. Therefore, it is possible to reduce the number of the parts by inhibiting the interposition of the other members. Accordingly, the assembly and the part management become easy, and it is possible to easily set the interval in the axial direction by inhibiting the accumulation of the assembling errors in the respective portions.

The lock ring 79 and the electromagnet 77 are arranged in the axial direction, so that it is possible to inhibit the loop of the line of magnetic force 125 formed between the electromagnet 77 and the lock ring 79 from a meandering to improve an operation response of the lock ring 79.

Since the engagement portions 83 and 85 are arranged so as to face to each other in the axial direction, it is possible to employ a dog clutch engaging face to face. This can make a stroke in the axial direction of the clutch lock ring 79 small.

The spring 103 energizing the lock ring 79 against the axial movement by the electromagnet 77 is provided. Therefore, an exciting control may be applied to the electromagnet 77 only for one axial movement of the lock ring 79, so that it is possible to reduce an electric power consumption.

According to the present embodiment, the spring 103 is arranged in the inner peripheral side of the engagement portions 83 and 85. Accordingly, it is possible to overlap the energizing member and the engagement portion in the radial direction. Therefore, and it is possible to achieve a downsizing in the axial direction. Further, arranging the energizing member in the inner peripheral side can inhibit a dispersion of a load in a peripheral direction applied to the clutch member.

According to the present embodiment, the coupling portion and the engagement portion are arranged individually in both sides of the clutch member, so that it is possible to transmit the rotational force in series.

The engagement teeth 83 and 85 are provided with the engagement surfaces 135 and 137 which are brought into contact with each other in the front and rear sides in the rotational direction at a time of the engagement. Therefore, it is possible to firmly engage the engagement teeth 83 and 85 to inhibit a rickety of the rotational force transmission, so that it is possible to execute a stable rotational force transmission.

The coupling apparatus is applied to the rear differential gear 1 having the differential mechanism 47 capable of the differential rotation of the pair of side gears 69 and 71 while transmitting the rotational force from the differential case 45 to a pair of side gears 69 and 71. Therefore, it is possible to obtain a compact and light coupling apparatus.

The coupling portion 81 is provided in the outer periphery of the side gear 71. Therefore, it is possible to make the load applied to the coupling portion 81 small to improve a durability thereof.

Figure 4A:
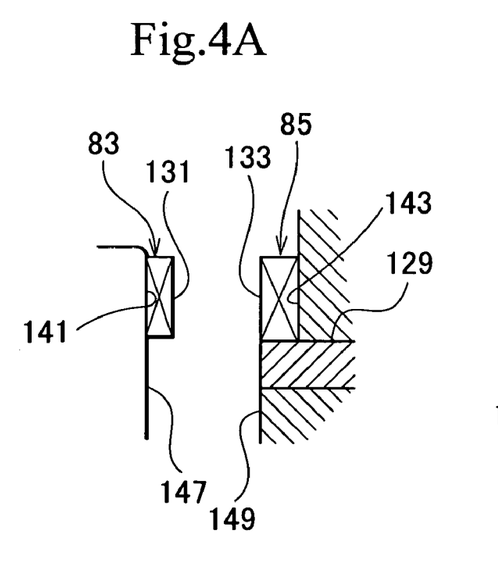
FIG. 4A is an expansion plan view of a main portion showing an engagement shutoff state of engagement teeth.
Figure 4B:
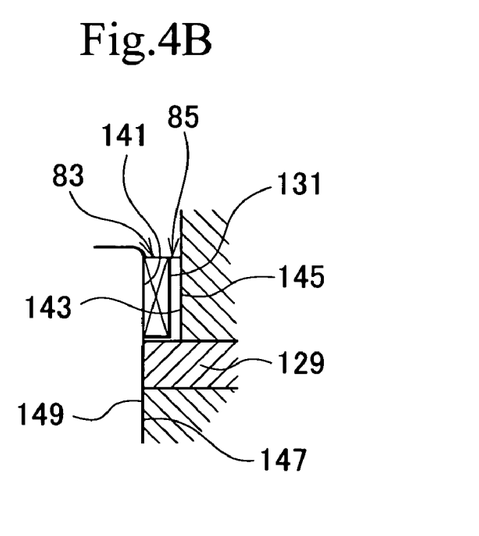
FIG. 4B is an expansion plan view of a main portion showing the engagement shutoff state of the engagement teeth according to a modified embodiment of the first embodiment.

FIGS. 4A and 4B show a modified embodiment of the first embodiment in the periphery of the engagement teeth, in which FIG. 4A is a cross sectional view of a main portion in an engagement shutoff state of the engagement teeth, and FIG. 4B is a cross sectional view of a main portion in an engaged state of the engagement teeth.

As shown in FIGS. 4A and 4B, the lock ring 79 and the differential case 45 are provided with striking surfaces 147 and 149 facing to each other, respectively. The striking surfaces 147 and 149 are arranged at positions which are different in a radial direction with respect to the engagement teeth 83 and 85, an inner side in the radial direction in FIG. 4. Accordingly, the string portions (corresponding to the striking surfaces 147 and 149) which strike against each other on the basis of the axial movement at the different positions shifting with respect to the engagement portions (corresponding to the engagement teeth 83 and 85) in the radial direction are provided in the clutch member (corresponding to the lock ring 79) and the other rotary member (corresponding to the differential case 45) side.

When the engagement teeth 83 and 85 are engaged with each other, the striking surfaces 147 and 149 strike against each other in a state in which the gaps 145 are respectively formed between the tooth tops 131 and 135 and the tooth bottoms 143 and 141 as shown in FIG. 4B.

Accordingly, it is possible to add a friction force by the striking surfaces 147 and 149 to an adsorption force by the electromagnet 77 to execute a firm rotational force transmission.

Second Embodiment

Figure 5:
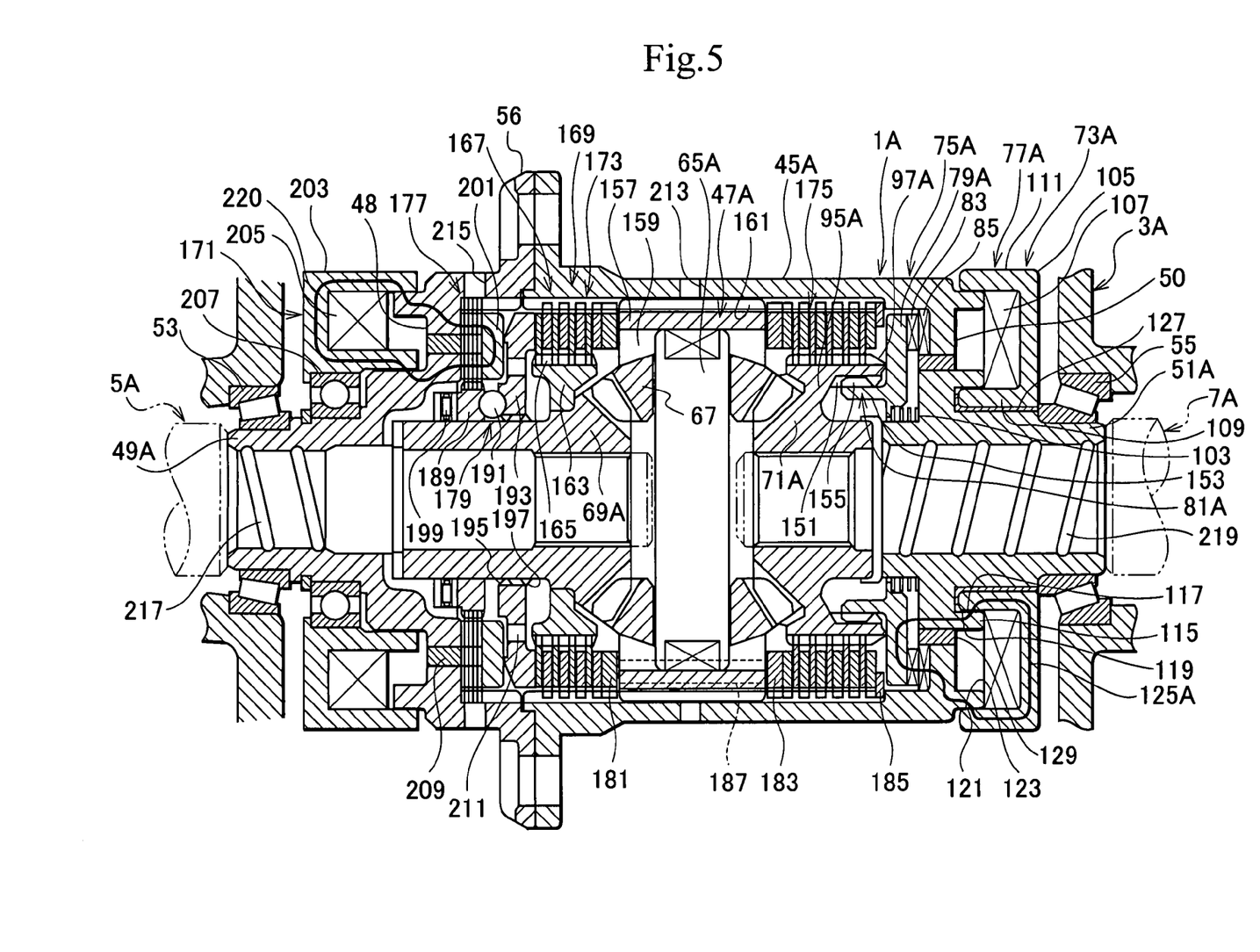
FIG. 5 is a cross sectional view showing a rear differential unit and a periphery thereof according to a second embodiment of the present invention.

FIG. 5 is a cross sectional view of a rear differential unit and a periphery thereof according to an second embodiment A basic structure is the same as that of the first embodiment shown in FIG. 2. In the following explanation, elements corresponding to those of the first embodiment are represented with like reference numerals or like reference numerals with A.

As shown in FIG. 5, a transmission portion for executing a rotational force transmission between the input and output side members is arranged in any one of inner and outer sides in the radial direction with respect to the coupling portion, in the present embodiment.

In a coupling portion 81A in accordance with the present embodiment, an inner spline 151 is provided in a side surface side of a side gear 71A and in an inner peripheral side of a clutch engagement portion 95A. The side gear 71A in this case can be formed by a forging. A lock ring 79A serving as a clutch member has an annular protruding portion 153 having a spline 155 in an outer periphery thereof. The spline 155 is splined to the inner spline 151 of the clutch engagement portion 95A.

A pinion shaft 65A of a differential mechanism 47A is engaged with an engagement groove 159 provided with a differential mechanism support ring 157. The differential mechanism support ring 157 is splined to an inner spline 161 provided in an inner peripheral surface of the differential case 45A.

A side gear 69A has a clutch engagement portion 163. The clutch engagement portion 163 is fixed to the side gear 69A by a welding or the like. A spline 165 is integrally provided in an outer peripheral surface of the clutch engagement portion 163.

According to the present embodiment, a rear differential unit 1A has a differential limiting mechanism 167 of the differential mechanism 47A. The differential limiting mechanism 167 includes a limiting mechanism portion 169 and an electromagnet 171.

The limiting mechanism portion 169 includes limiting clutches 173 and 175 capable of applying a pressing force and cancel the application, a pilot clutch 177 which is fastened on the basis of an operation of the electromagnet 171, and a cam mechanism 179 which is operated by the fastening of the pilot clutch 177 and the differential rotation.

The limiting clutches 173 and 175 and the pilot clutch 177 are constituted by a wet-type multiple disc clutch.

The limiting clutch 173 is interposed between the differential case 45A and the side gear 69A The limiting clutch 173 has outer plates and inner plates. The outer plates of the limiting clutch 173 are splined to the inner spline 161 of the differential case 45A, and the inner plates are splined to the spline 165 of the side gear 69A. A transmission plate 181 is interposed between the limiting clutch 173 and the differential mechanism support ring 157.

The limiting clutch 175 is interposed between the differential case 45A and the side gear 71A. The limiting clutch 175 has outer plates and inner plates. The outer plates of the limiting clutch 175 are splined to the inner spline 161 of the differential case 45A, and the inner plates are splined to the spline 97A of the side gear 71A. A transmission plate 183 is interposed between the limiting clutch 175 and the differential mechanism support ring 157. The limiting clutch 175 is received by a stopper ring 185 attached to the differential case 45A.

According to the structure mentioned above, the transmission portion (corresponding to the limiting clutch 175) for executing the rotational force transmission between the input and output side members (corresponding to the differential case 45A and the side gear 71A) is arranged in any one of the inner and outer sides in the radial direction with respect to the coupling portion 81A (in the outer side in the radial direction in the present embodiment).

A transmission rod 185 is interposed between the transmission plates 181 and 183. The transmission rod 185 is arranged so as to pass through the differential mechanism support ring 157 in the axial direction at a position staying away from the engagement groove 159 in a peripheral direction.

The pilot clutch 177 is arranged between the differential case 45A and a cam ring 189. The pilot clutch 177 has outer plates and inner plates. The outer plates of the pilot clutch 177 are splined to an inner periphery of the differential case, and the inner plate are splined to the cam ring 189.

The cam mechanism 179 is constituted by a ball cam, and is structured such that a cam ball 191 is arranged between cam surfaces of the cam ring 189 and a pressure plate 193. An inner spline 195 provided in an inner peripheral side of the pressure plate 193 is splined to a spline 197 provided with the side gear 69A. A thrust needle bearings 199 are interposed between the cam ring 189 and the side wall 48 of the differential case 45A.

The electromagnet 171 can attract an armature 201. The armature 201 is arranged adjacently in one side of the pilot clutch 177.

The electromagnet 171 includes a yoke 203 and an electromagnetic coil 205. The yoke 203 is borne to the differential case 45A via a bearing 207. The yoke 203 has a engagement portion (not shown) engaging with a lock portion (not shown) provided with the differential carrier 3A, whereby the yoke 203 is prevent from rotating. A non-magnetic material ring 209 made from a stainless steel or the like is provided in the side wall 48 of the differential case 45A, to prevent a short of a magnetic flux of the electromagnet 171.

Openings 211, 213 and 215 for circulating a lubricating oil are provided in the pressure plate 193 and the differential case 45A. Spiral grooves 217 and 219 for circulating the lubricating oil are provided in inner peripheries of boss portions 49A and 51A of the differential case 45A, respectively.

According to the present embodiment, if both of the electromagnets 77A and 171 are not controlled to be excited, there are not executed the differential limiting by the differential limiting mechanism 167 and the differential lockup by the differential lock mechanism 73A. Accordingly, the drive rotation input from the differential case 45A can be output to left and right axle shafts 5A and 7A from the left and right side gears 69A and 71A while allowing the differential rotation by the differential mechanism 47A.

If the electromagnet 171 is excited in accordance with the exciting control, a loop of a line of magnetic force 220 is formed to suck an armature 201. The pilot clutch 177 is fastened on the basis of the suction of the armature 201 to generate a pilot torque.

When the left and right rear wheels 9 and 11 start the differential rotation in a state in which the pilot torque is generated in the pilot clutch 177, the side gears 69A and 71A starts the differential rotation with respect to the differential case 45A As this result, the cam of the cam ring 189 and the pressure plate 193 are displaced forward and backward in the rotational direction with respect to the cam ball 191. On the basis of the displacement of the cam surfaces, the cam ball 191 runs on the cam surface, so that the cam mechanism 179 operates so as to generate a thrust. The thrust is received by the side wall 48 of the differential case 45A via the thrust needle bearing 199 and the thrust as a reaction force is applied to the pressure plate 193 to be moved, thereby a pressing force is applied to the limiting clutch 173.

The pressing force applied to the limiting clutch 173 from the pressure plate 193 is transmitted to the transmission plate 181, the transmission rod 187, the transmission plate 183 and the limiting clutch 175, and is received by the differential case 45A via the stopper ring 185.

Accordingly, the limiting clutches 173 and 175 are fastened, a relative rotation of the side gears 69A and 71A with respect to the differential case 45A is limited. Therefore, the differential rotation between the side gears 69A and 71A is limited.

On the basis of the limiting of the differential rotation, a differential limiting force is applied between the left and right rear wheels 9 and 11. It is possible to control the differential limiting force mentioned above by a controller or the like in correspondence to a driving condition, a road surface condition or the like to widely improve a handling property.

In this case, if the exciting control of the electromagnet 171 is cancelled, the pilot torque by the pilot clutch 177 disappears, so that the rotation of the cam ring 189 becomes free. Accordingly, the cam ring 189 can integrally rotate with the pressure plate 193 via the cam ball 191, and the thrust by the cam mechanism 179 is cancelled. The coupling of the limiting clutches 173 and 175 is cancelled on the basis of the thrust cancellation, and the differential rotation by the differential mechanism 47A becomes free again.

An operation of the differential lock mechanism 73A side is approximately the same as that of the first embodiment, and it is possible to widely improve a running property on the punishing road according to the lockup of the differential rotation.

According to the present embodiment, it is possible to achieve the same operations and effects as those of the first embodiment In addition, in the present embodiment, the limiting clutch 175 for executing the rotational force transmission between the differential case 45A and the side gear 71A is arranged in the outer side in the radial direction with respect to the coupling portion 81A. Therefore, it is possible to achieve a downsizing in the axial direction of the apparatus by overlapping the coupling portion 81A and the limiting clutch 175 in the radial direction while providing the differential limiting mechanism 167.

Third Embodiment

Figures 6A, 6B:
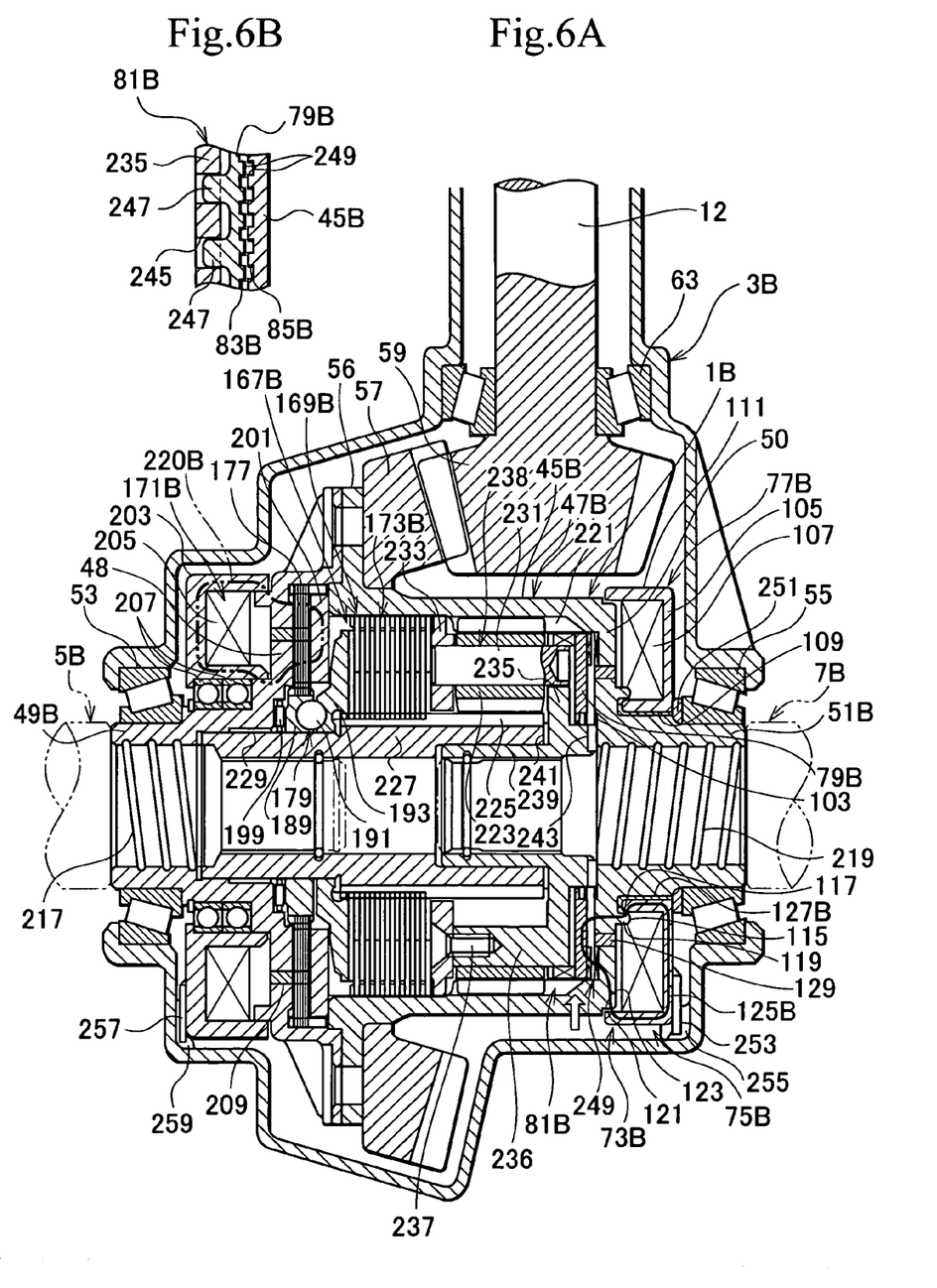
FIG. 6 is a cross sectional view showing a rear differential unit and a periphery thereof according to a third embodiment of the present invention.

FIGS. 6A and 6B show an third embodiment according to the present invention, in which FIG. 6A is a cross sectional view showing a differential unit and a periphery thereof, and FIG. 6B is an explanatory view showing a relation among a lock ring, a coupling portion and engagement teeth. In this case, a basic structure corresponds to the second embodiment shown in FIG. 5. In the following explanation, elements corresponding to those of the second embodiment are represented with like reference numerals or like reference numerals with B like reference numerals with B in place of A.

As shown in FIG. 6A, in a differential gear 1B in accordance with the present embodiment, a differential mechanism 48B is constituted by a planetary gear mechanism, and a coupling portion 81B is provided in an outer periphery of a carrier plate 235.

A differential mechanism 47B includes an internal gear 221, an outer planetary gear 223, an inner planetary gear (not shown), a sun gear 225 and the like.

The internal gear 221 is formed in an inner periphery of a differential case 45B, and the sun gear 225 is formed in one hub 227. The hub 227 is supported to the differential case 45B via a slidable ring 229 so as to be relatively rotatable. The hub 227 is coupled to an axle shaft 5B.

The outer planetary gear 223 and the inner planetary gear are engaged with each other. Further, the outer planetary gear 223 is engaged with the internal gear 221, and the inner planetary gear is engaged with the sun gear 225.

The outer planetary gear 223 and the inner planetary gear are rotatably supported to a carrier pin 231. The carrier pin 231 is supported to carrier plates 233 and 235. The carrier plate 235 is provided with leg portions 236 at a predetermined interval in a peripheral direction, and the other carrier plate 233 is fastened and fixed to the carrier plate 235 by a bolt 237. A planetary carrier 238 is structured by the carrier pin 231, and the carrier plates 233 and 235.

The carrier plate 235 is integrated with the other hub 239. The hub 239 can be relatively rotated with respect to the differential case 45B, and serves as one (corresponding to the hub 239) of a pair of relatively rotatable rotary members (corresponding to the differential case 45B and the hub 239). The hub 239 is coupled to an axle shaft 7B.

Slidable washers 241 and 243 are interposed between the hubs 227 and 239 in an axial direction and between the hub 239 and the differential case 45B in an axial direction, respectively.

As shown FIG. 6B, the coupling portion 81B includes engagement convex portions 247 of a lock ring 79B serving as the clutch member and engagement concave portions 245. The engagement convex portions 247 engage with the engagement concave portion 245 respectively. Accordingly, the coupling portion 81B is provided in an outer periphery of the one rotary member (corresponding to the hub 239 and the carrier plate 235). Engagement teeth 83B and 85B serving as a dog clutch 249 respectively are provided in facing surfaces of the lock ring 79B and the differential case 45B. In this case, the engagement teeth 83B and 85B also have engagement surfaces as front and rear surfaces brought into contact with each other in a rotational direction.

An electromagnet 77B has a yoke 105 supported to an outer periphery of a boss portion 51B of the differential case 45B via a non-magnetic material ring 127B made from a stainless steel or the like so as to be relatively rotatable. A non-magnetic material washer 251 made from a stainless steel or the like is interposed between the yoke 105 and the bearing 55. The yoke 105 has an engagement portion 253 locked to a locking portion 255 provided with the differential carrier 3B in the rotational direction.

A limiting clutch 173B of a limiting mechanism portion 169B is interposed between the differential case 45B and the hub 227 to be arranged in adjacent to the carrier plate 105. Outer plates of the limiting clutch 117 are splined to the differential case 45B, and inner plates are splined to the hub 227. An electromagnet 171B of the limiting mechanism 169B has an engagement portion 257 locked to a locking portion 259 in the differential carrier 3B in the rotational direction.

According to the present embodiment, in the differential limiting mechanism 167B, a loop of a line of magnetic force 220B is formed by controlling to excite the electromagnet 171B, so that the limiting clutch 173B can be fastened to execute a differential limit of the differential mechanism 47B in the same manner as the second embodiment.

In the differential lock mechanism 73B, if the electromagnet 77B is controlled to be excited, a loop of a line of magnetic force 125B is formed, and the lock ring 79B is sucked. The dog clutch 249 is engaged on the basis of the suction, and the differential case 45B and the carrier plate 235 are locked therebetween. On the basis of the lock the differential rotation of the differential mechanism 47B is locked up, so that the differential rotation of the left and right rear wheels 9 and 11 is locked.

According to the present embodiment, it is possible to achieve approximately the same operations and effects as those of the second embodiment In addition, in the present embodiment, since the coupling portion 81B is provided in the outer periphery of the carrier plate 235 integrated with the hub 239, it is possible to make the load applied to the coupling portion 81B small to improve a durability.

Fourth Embodiment

Figures 7A, 7B:
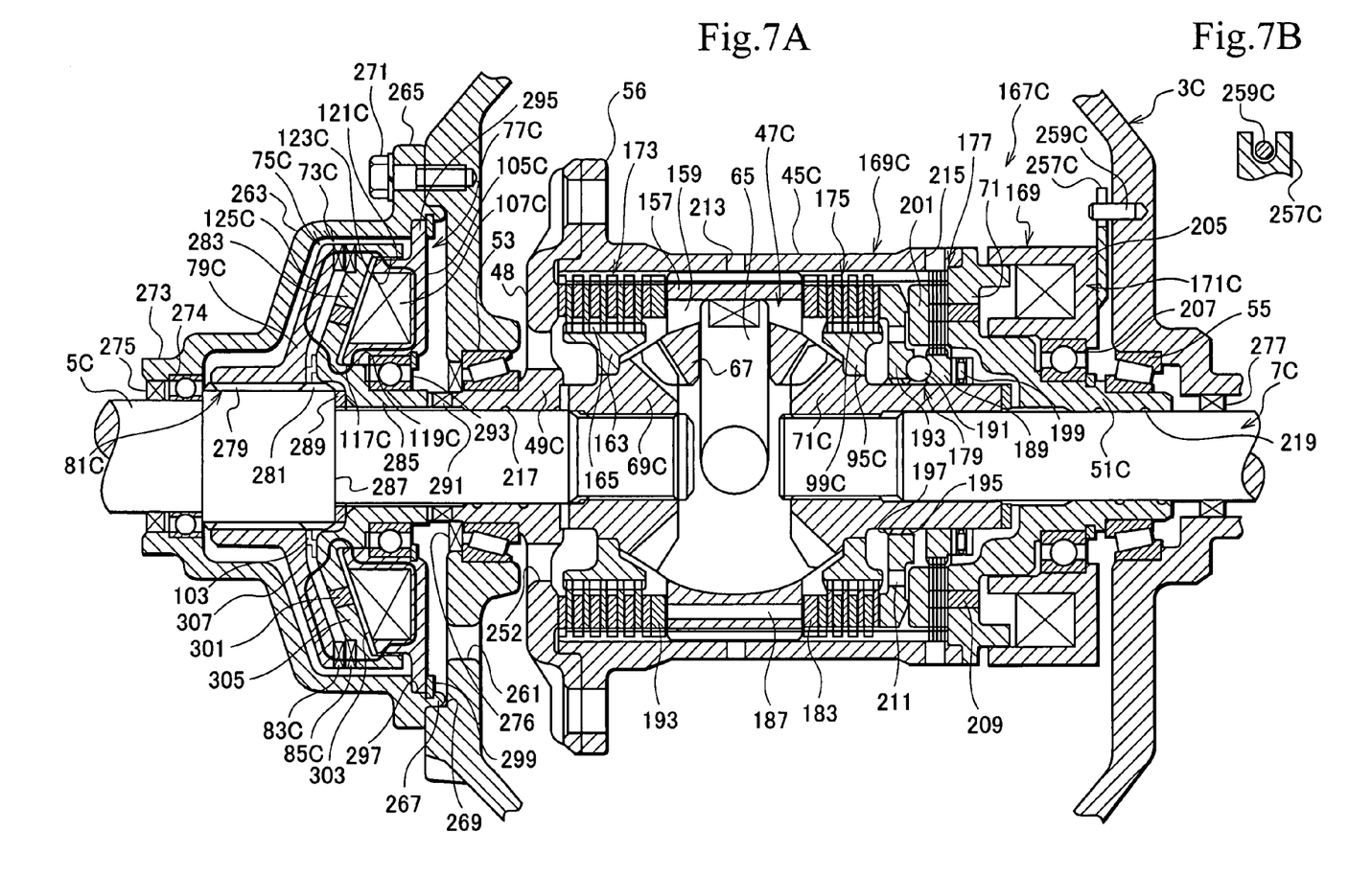
FIG. 7 is a cross sectional view showing a rear differential unit and a periphery thereof according to a fourth embodiment of the present invention.

FIGS. 7A and 7B show an fourth embodiment according to the present invention, in which FIG. 7A is a cross sectional view showing a rear differential unit and a periphery thereof, and FIG. 7B is an explanatory view showing an engagement of a limiting actuator with a differential carrier. In the present embodiment, a basic structure is the same as that of the second embodiment shown in FIG. 5. In the following explanation, elements corresponding to those of the second embodiment are represented with like reference numerals or like reference numerals with C or like reference numerals with C in place of A.

As shown in FIG. 7A, in a differential gear 1C in accordance with the present embodiment, a layout of a differential lock mechanism 73C and a differential limiting mechanism 167C is changed. In the present embodiment, the differential limiting mechanism 167C is arranged in the other side with respect to the coupling flange 56 of a differential case 45C. A clutch engagement portion 95C provided in a side gear 71C is independently formed in the same manner as a clutch engagement portion 163 in a side of a side gear 69C, and is firmly fixed integrally to the side gear 71C by a welding or the like.

An electromagnet 171C of the differential limiting mechanism 167C has an engagement portion 257C fixed to a yoke 203C which is locked to a pin-like locking portion 259C fixed to a differential carrier 3C, whereby the electromagnet 171C is prevent from rotating.

Openings 252 circulating the lubricating oil in the coupling flange 56 side is provided in the differential case 45C in the same manner as mentioned above, and an opening 261 circulating the lubricating oil is also provided in a side wall of the differential carrier 3C.

The differential lock mechanism 73C is arranged within a receiving cover 263 so as to lock between the axle shaft 5C and the differential case 45C. The receiving cover 263 has an attachment flange 265. The attachment flange 265 has an attachment convex portion 267 formed in an annular shape. An attachment concave portion 269 having annular shape is formed in a side wall of the differential carrier 3C corresponding to the attachment convex portion 267. The attachment convex portion 267 of the receiving cover 263 is fitted to the attachment concave portion 269 of the differential carrier 3C, and the attachment flange 265 is fastened and fixed to the side wall by bolts 271. Namely, the receiving cover 263 is attached to the differential carrier 3C. The receiving cover 263 is centered on the basis of the fitting of the attachment convex portion 267 to the attachment concave portion 269, and the electromagnet 77C is centered by extension.

Bearings 274 are interposed between a leading end 273 of the receiving cover 263 and the axle shaft 5C. Oil seals 275 and 277 are interposed between the leading end 273 of the receiving cover 263 and the axle shaft 5C, and between the axle shaft 7C and the other side wall of the differential carrier 3C respectively.

A lock ring 79C of the differential lock mechanism 73C serves as the clutch member, and an inner spline 279 provided in an inner periphery thereof is splined to a spline 281 provided with the axle shaft 5C. The inner spline 279 and the spline 281 structure a coupling portion 81C. The lock ring 79C is capable of being engaged and disengaged with respect to an engagement ring 283 by outer peripheral side engagement teeth 83C and 85C.

The engagement ring 283 has an engagement boss portion 285 in an inner peripheral side. The engagement boss portion 285 is fitted to the axle shaft 5C. A slidable washer 289 is interposed between the engagement boss portion 285 and a step portion 287 provided with the axle shaft 5C. The engagement boss portion 285 is engaged with a boss portion 49C of the differential case 45C by an engagement portion 291 having a concave-convex shape.

The electromagnet 77C is supported to an outer periphery of the engagement boss portion 285 via bearings 293. A yoke 105C of the electromagnet 77C has a peripheral flange 295. The peripheral flange 295 is fitted into a positioning concave portion 297 provided with the receiving cover 263, so that the electromagnet 77C is positioned in the radial direction and the axial direction. A stopper ring 299 is provided in an opening side of the positioning concave portion 297. The peripheral flange 295 is prevented from coming off with respect to the positioning concave portion 297 by the stopper ring 299. A non-magnetic material ring 301 is provided in the engagement ring 283.

According to the present embodiment, an outer peripheral surface 119C in an inner side in a radial direction of the engagement ring 283 faces to an inner peripheral surface 117C in an inner side in a radial direction of the yoke 105C with a gap, and an inner peripheral surface 123C in an outer side in a radial direction of the engagement ring 283 faces to an outer peripheral surface 121C in an outer side in a radial direction of the yoke 105C with a gap.

The electromagnet 77C is formed in such a manner that a winding number of an electromagnetic coil 107C is reduced gradually to an outer peripheral side. An end surface 303 of the electromagnet 77C, a wall portion 305 of the engagement ring 283, a wall portion 307 of the lock ring 79C, and a wall portion 309 of the receiving cover 263 are all set in a tapered incline in correspondence to the winding number.

According to the present embodiment, the differential limiting mechanism 167C limits a differential rotation between the differential case 45C and the side gears 69C and 71C, and the differential lock mechanism 73C locks up a differential rotation between the differential case 45C and the axle shaft 5C.

The limiting clutches 173 and 175 are fastened in the same manner as that of the second embodiment, by controlling to excite the electromagnet 171C of the differential limiting mechanism 167C, whereby it is possible to achieve the differential limiting of the differential mechanism 47C.

When controlling to excite the electromagnet 77C of the differential lock mechanism 73C, a loop of a line of magnetic force 125C is formed around the yoke 105C, the engagement ring 283, and the lock ring 79C. Accordingly, the lock ring 79C slides with the inner spline 279 and the spline 281, and the engagement teeth 83C and 85C are engaged. On the basis of the engagement, the relative rotation among the axle shaft 5C, the lock ring 79C, the engagement ring 283, and the differential case 45C is locked, so that the differential mechanism 47C is locked up.

When the exciting control is cancelled, a spring 103 makes the lock ring 79C moved in the axial direction on the axle shaft 5C to disengage the engagement teeth 83C and 85C.

In this case, the lubricating oil is supplied to the differential mechanism 47C via the openings 213 and 215 and the like, and the lubrication to the pilot clutch 177 is executed via the opening 215 and the like. The lubrication of the differential lock mechanism 73C is executed via the opening 261 and the like.

According to the present embodiment, it is possible to achieve approximately the same operations and effects as those of the second embodiment In addition, in the present embodiment, since the electromagnet 171C of the differential limiting mechanism 167C is arranged between the differential case 45C and the bearing 55, and the differential lock mechanism 73C is arranged in the outer side in the axial direction of the bearing 53 with respect to the differential case 45. Therefore, it is possible to inhibit an increase of a bearing span of the differential case 45C to improve a support rigidity of the differential case 45C. Further, it is possible to improve a freedom of selecting a structure and a shape of the differential lock mechanism 73C. That is, the differential lock mechanism 73C is arranged in the outer side in the axial direction of the bearing 53 with respect to the differential case 45C, and gets relief from a layout restriction between the bearing 53 and the differential case 45C. Accordingly, it is possible to comparatively freely select a volumetric capacity, a characteristic and the like of the mechanism.

The differential lock mechanism 73C is arranged within the receiving cover 263. Therefore, it is possible to improve an assembling property of the differential lock mechanism 73C. Further, it is possible to select with or without an additional layout in correspondence to a necessity of the differential lock mechanism 73C concerning the rear differential gear 1C by appropriately setting the structure of the oil seal 275 and the like corresponding to a coupling, supporting and sectioning seal of the receiving cover 263. Namely, on the assumption that the differential limiting mechanism 167C is mounted normally, it is possible to largely improve a running stability of the vehicle. In this case, the differential carrier 3C and the receiving cover 263 are sectioned to separate the lubrication environment thereof in correspondence to a necessity, so that the differential carrier 3C and the receiving cover 263 can be accurately cooled and lubricated by oil corresponding to function respectively.

Further, it is possible to widely improve a productivity by additionally arranging the differential lock mechanism 73C as occasion demands.

Since the receiving cover 263 is fixed to the side wall of the differential carrier 3C, it is possible to easily attach the receiving cover 263.

Fifth Embodiment

Figure 8:
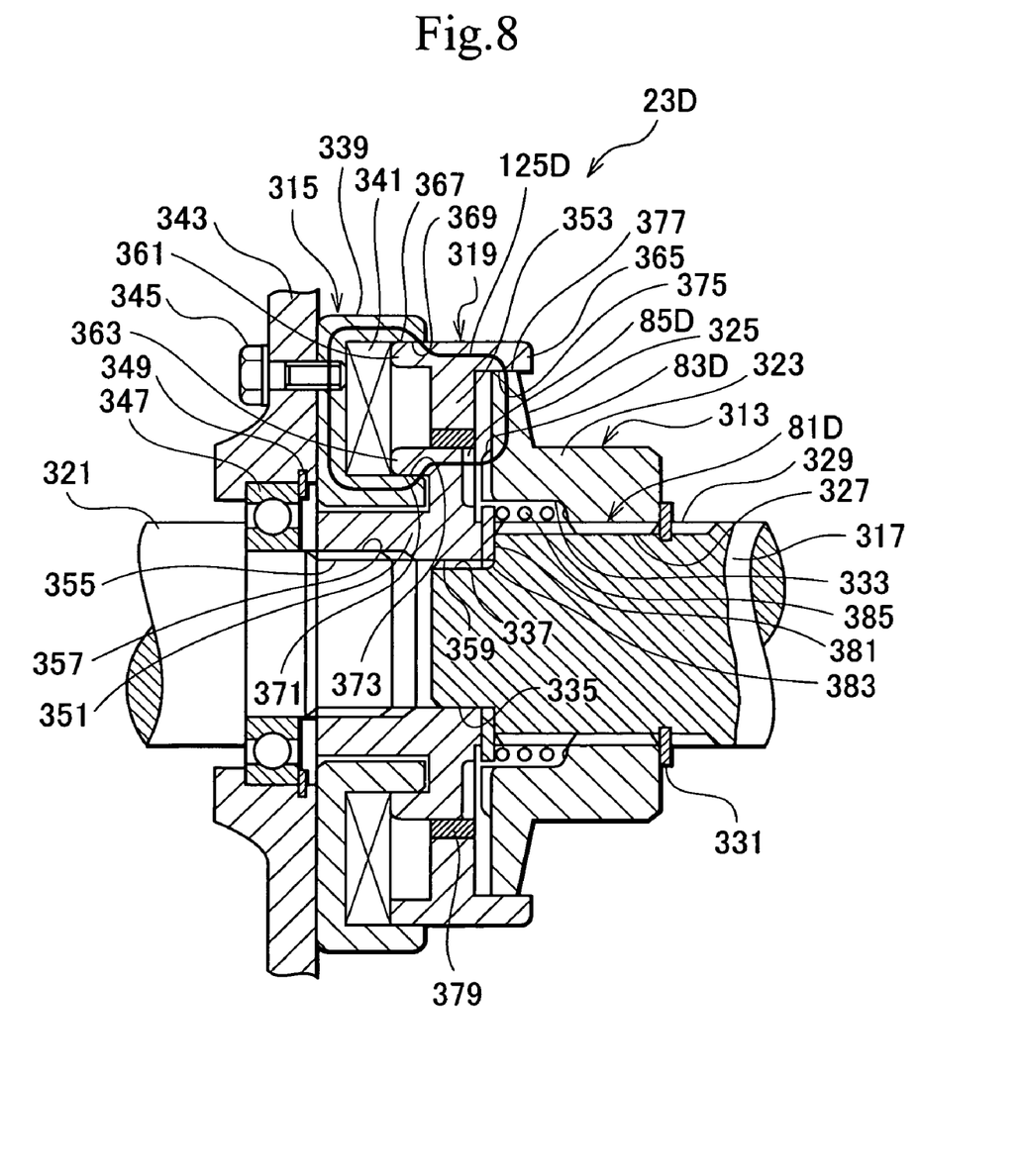
FIG. 8 is a cross sectional view showing a rear differential unit and a periphery thereof according to a fifth embodiment of the present invention.

FIG. 8 shows a cross sectional view of an interrupting mechanism according to an fifth embodiment of the present invention.

An interrupting mechanism 23D in accordance with the present embodiment is structured by a coupling apparatus, and is applied, for example, to the transfer 19 in FIG. 1. It includes a clutch member 313 and an electromagnet 315.

The clutch member 313 is rotationally engaged with a rotary shaft 317 serving as the rotary member by a coupling portion 81D and is capable of moving in an axial direction. The clutch member 313 has engagement teeth 83D capable of engaging and interrupting with engagement teeth 85D provided with an engagement ring 319 on the basis of the movement of the clutch member 313 in the axial direction. The engagement ring 319 is splined to a rotary shaft 321.

That is, the clutch member 313 is rotationally engaged with one (corresponding to the rotary shaft 317) of a pair of rotary members (corresponding to the rotary shafts 317 and 321) capable of relatively rotating with each other by the coupling portion 81D, is movable in the axial direction, and is structured such that the engagement portion (corresponding to the engagement teeth 83D) can engage and interrupt with the engagement portion (corresponding to the engagement teeth 85D) in a side (corresponding to the engagement ring 319) of the other rotary member (corresponding to the rotary shaft 321).

Further, the clutch member 313 includes a cylinder portion 323 and a flange portion 325. The cylinder portion 323 is provided with an inner spline 327 serving as a one part of the coupling portion 81D in an inner periphery thereof. The inner spline 327 is engaged with a spline 329 provided with the rotary shaft 317 to serve as the other part of the coupling portion 81D. A spring seat concave portion 333 is provided in an inner periphery in a side of the flange portion 325 of the clutch member 313. The engagement teeth 83 is provided in an inner peripheral side of an end surface of the flange portion 325.

A snap ring 331 is attached to the rotary shaft 317 so as to regulate the axial movement more than a fixed level of the clutch member 313. A fitting shaft portion 335 is provided in a leading end of the rotary shaft 317. A concave portion 337 is provided in an outer peripheral surface of the fitting shaft portion 335.

The electromagnet 315 includes a yoke 339 and an electromagnetic coil 341. The yoke 339 is fastened and fixed to a wall portion 343 as a fixed side such as a housing of a transfer case or the like by a bolt 345. Bearings 347 is arranged in an inner periphery of the wall portion 343. The rotary shaft 321 is supported to the inner periphery of the wall portion 343 via the bearings 347. The bearings 347 are positioned by a snap ring 349.

The engagement ring 319 includes a cylinder portion 351 and a flange portion 353. An inner spline 355 is provided in one side in an inner periphery of the cylinder portion 351 engaging with a spline 357 provided with the rotary shaft 321. Accordingly, the engagement ring 319 structures a member in a side of the rotary shaft 321 with respect to the clutch member 313. The other side in the inner periphery of the cylinder portion 351 forms a fitting axial hole 359. The fitting axial hole 359 is fitted to the fitting shaft portion 335 of the rotary shaft 317 so as to be relatively rotatable.

The flange portion 353 is provided with protruding portions 361 and 363 in one surface side in an axial direction thereof, and a protruding portion 365 in the other surface side thereof. An outer peripheral surface 367 of the protruding portion 361 faces to an inner peripheral surface 369 in an outer peripheral side of the yoke 339 with a gap. An inner peripheral surface 371 of the protruding portion 363 faces to an outer peripheral surface 373 in an inner peripheral side of the yoke 339 with a gap. An inner peripheral surface 375 of the protruding portion 365 faces to an outer peripheral surface 377 of the flange portion 325 of the clutch member 313 with a gap. A plurality of through holes 379 are provided in an outer peripheral side of the engagement teeth 85D at a predetermined interval in a peripheral direction, in an intermediate portion in a radial direction of the flange portion 353. Namely, a thin portion is provided in the engagement ring 369 according to the through holes 379.

In accordance with the structure mentioned above, the facing surfaces (corresponding to the inner and outer peripheral surfaces 375 and 377) in the radial direction through which the line of magnetic force passes, are provided in the side (corresponding to the engagement ring 319) of the clutch member 313 and the other rotary member (corresponding to the rotary shaft 321).

Further, the thin portion inhibiting the short of the line of magnetic force is provided in the side (corresponding to the engagement ring 319) of the other rotary member (corresponding to the rotary shaft 321) according to the through holes 379, and the engagement portions (corresponding to the engagement teeth 83 and 85) transmit the rotational force without passing through the thin portion. In this case, it may employ a member having a low magnetism in stead the thin portion.

A washer 381 is interposed between the cylinder portion 351 of the engagement ring 319 and the rotary shaft 317 in the axial direction. A convex portion 383 is provided in an inner periphery of the washer 381 to be engaged with the concave portion 337. A coil spring 385 serving as an energizing member is interposed between the cylinder portion 351 of the engagement ring 319 and a spring seat concave portion 333 of the clutch member 313 via the washer 381.

According to the present embodiment, if the electromagnet 315 is not controlled to be excited, the engagement teeth 83 and 83 are in a disconnected state. Therefore, the rotary shafts 317 and 321 are relatively rotatable therebetween, so that the transmission of the rotational force is not executed.

If the electromagnet 315 is controlled to be excited, a loop of a line of magnetic force 125D passing through the engagement portions 83 and 85 is formed on the yoke 339, the engagement ring 319 and the clutch member 313. The clutch member 313 moves in the axial direction against the energizing force of the coil spring 185 while rotationally engaging with the rotary shaft 317 through the coupling portion 81D on the basis of the line of magnetic force 387. The engagement teeth 83 is engaged with the engagement teeth 85 on the basis of the movement, thereby it is possible to achieve the rotational force transmission between the rotary shafts 321 and 317.

If the exciting control of the electromagnet 315 is again cancelled, the clutch member 313 is returned to the original position by receiving the energizing force of the coil spring 385 to disengage the engagement teeth 83 and 85.

According to the present embodiment, it is possible to directly move the clutch member 313 on the basis of the magnetic force of the electromagnet 315. Therefore, and it is possible to reduce the number of the parts by inhibiting the interposition of the other members. Accordingly, the assembly and the part management become easy, and it is possible to easily set the interval in the axial direction by inhibiting the accumulation of the assembling errors of the respective parts.

According to the present embodiment, the thin portion inhibiting the short of the line of magnetic force 125D is provided in the engagement ring 319 by the through holes 379, and the engagement portions 83 and 85 execute the rotational force transmission without passing through the thin portion. Therefore, it is possible to prevent the load of the rotational force from being applied to the thin portion which tends to be weakened in strength to form advantageously in strength. The same matter is applied to the case that the member having the low magnetism is provided in place of the thin portion.

The inner and outer peripheral surfaces 375 and 377 corresponding to the facing surfaces in the radial direction through which the line of magnetic force 125D passes are provided in the clutch member 313 and the engagement ring 319. Therefore, it is possible to easily secure the facing surfaces through which the line of magnetic force 125D passes.

In this case, in the embodiments mentioned above, the description is given on the assumption that the differential unit is constituted by the rear differential unit However, in FIG. 1, it is possible to apply the differential unit as a front differential gear 35 or it is possible to structure as a center differential unit by adding the center differential unit to the transfer 19. Additionally, the interrupting mechanism 23D in accordance with the fifth embodiment may be applied to an interrupting mechanism 23E in the axle shaft 39 or a start clutch 23F or the like.

It may employ one of the rotary members is formed as the differential case and the other formed as the axle shaft.

According to the coupling apparatus of the present invention, a electromagnet may arranged on a clutch member which is rotationally engaged with one of a pair of rotary members capable of relatively rotating with each other via bearings or bushings or the like for allowing to relatively rotate. The electromagnet may move in the axial direction together with the clutch member to engage and interrupt with respect to the other rotary member.

In this case, when controlling to excite the electromagnet, a loop of a line of magnetic force is formed around the electromagnet, the coupling member, and the other rotary member to move the electromagnet and the coupling member with respect to the other rotary member in axial direction.

What is claimed is:

1. A coupling apparatus applied to a differential unit including a differential case and a side gear arranged in the differential case, the differential case and side gear rotating relative to each other, the coupling apparatus comprising:
a clutch member disposed between a side wall of the differential case and the side gear in an axial direction, the clutch member being rotationally engaged with the side gear through a coupling portion so as to rotate relative to the differential case integral with the side gear, and being movable in the axial direction;
engagement portions integrally formed, one on the clutch member and another on the side wall of the differential case, the engagement portions engaging and interrupting with each other on the basis of the axial movement of the clutch member, thereby effecting locking and unlocking between the side gear and the differential case; and
an electromagnet which executes the axial movement of the clutch member on the basis of a line of magnetic force passing through the engagement portions.

2. The coupling apparatus of claim 1, wherein the clutch member and the electromagnet are arranged in the axial direction.

3. The coupling apparatus of claim 1, wherein the engagement portions are arranged so as to face each other in the axial direction.

4. The coupling apparatus of claim 1, further comprising a biasing member for biasing the clutch member against the movement in the axial direction by the electromagnet.

5. The coupling apparatus of claim 4, wherein the biasing member is arranged in an inner peripheral side of each of the engagement portions.

6. The coupling apparatus of claim 1, wherein the coupling portion and a one of said engagement portions of the clutch member are arranged individually in both sides of the clutch member.

7. The coupling apparatus of clam 1, further comprising:
a low magnetism member, inhibiting a short of the line of magnetic force, being provided in the differential case side, wherein the engagement portions transmit the rotational force without passing through the low magnetism member.

8. The coupling apparatus of claim 1, further comprising striking portions, striking against each other on the basis of the axial movement, provided in the clutch member and the differential case side at different positions shifting in the radial direction wit respect to a one of the engagement portions of the differential case.

9. The coupling apparatus of claim 1, further comprising engagement surfaces provided on the engagement portions, the engagement surfaces being brought into contact with each other in front and rear sides thereof in a rotational direction thereof at a time of the engagement.

10. The coupling apparatus of claim 1, wherein:
   the differential unit is provided with a differential mechanism executing rotational force transmission in such a manner as to allow a differential rotation from an input side member to an output side member, said side gear serves as the output side member, and the differential case serves as the input side member.

11. The coupling apparatus of claim 10, further comprising a transmission portion, executing the rotational force transmission between the input and output side members, arranged in any one of inner and outer sides in the radial direction of the coupling portion.

12. coupling apparatus of claim 10, wherein the coupling portion is provided in an outer periphery of the side gear.

13. The coupling apparatus of claim 1, wherein:
   the electromagnet is disposed adjacent to the side wall on the outside of the differential case, thereby forming the line of magnetic force passing through the engagement portions via the side wall.

* * * * *